United States Patent [19]
Waldrop

[11] Patent Number: 5,291,738
[45] Date of Patent: Mar. 8, 1994

[54] VAPOR RECOVERY APPARATUS AND METHOD

[75] Inventor: Richard Waldrop, Kinnelon, N.J.

[73] Assignee: Edwards Engineering Corp., Pompton Plains, N.J.

[21] Appl. No.: 986,515

[22] Filed: Dec. 7, 1992

[51] Int. Cl.⁵ .................................................. F25J 3/00
[52] U.S. Cl. ......................................... 62/36; 62/48.2; 165/166
[58] Field of Search .......................... 62/36, 48.2, 51.1; 165/166

[56] References Cited

U.S. PATENT DOCUMENTS

| | | | |
|---|---|---|---|
| 3,992,168 | 11/1976 | Toyama et al. | 62/36 |
| 4,110,996 | 9/1978 | Thompson | 62/48.2 |
| 4,116,017 | 9/1978 | Oberpriller | 62/51.1 |
| 4,237,700 | 12/1980 | Rothchild | 62/51.1 |
| 4,721,164 | 1/1988 | Woodward | 62/36 |

Primary Examiner—Ronald C. Capossela
Attorney, Agent, or Firm—Thomas L. Adams

[57] ABSTRACT

A vapor recovery apparatus consumes a source of liquified gas to condense vapors in a source of vapors. The apparatus includes an economizing heat exchanger and a finishing heat exchanger. The economizing heat exchanger has a vapor path adapted to be connected to the source of vapors, and a recovery path for exchanging heat with, and cooling vapors in, the vapor path. The finishing heat exchanger has a finishing path connected downstream of the vapor path of the economizing heat exchanger, and a coolant path adapted to be connected to the source of liquified gas for cooling and condensing vapors in the finishing path. The coolant path is isolated from the finishing path to avoid interpath mixing. The finishing path is connected to feed the recovery path of the economizing heat exchanger.

62 Claims, 2 Drawing Sheets

VAPOR RECOVERY APPARATUS AND METHOD

BACKGROUND OF THE INVENTION

1. Field of the Invention

The present invention relates to vapor recovery apparatus and, in particular, apparatus consuming liquified gas to condense vapors.

2. Description of Related Art

Since the passage of the Clean Air Act, the Congress of the United States has required all persons or organizations handling hydrocarbons or chemicals whose vapors may pollute the air to install means to recover and prevent the contamination of the air by such vapors. Such contaminant can include vapors of gasoline, methylene chloride and other organic compounds.

Such vapors are generated and displaced into the atmosphere when all types of tanks are filled with liquid hydrocarbons or liquid chemicals. Such tanks may be large storage tanks, railroad car tanks, truck tanks, underground storage tanks for gasoline stations and fuel tanks on trucks, buses and automobiles. When these various types of tanks are filled with liquid hydrocarbons or liquid chemicals, vapors escape into the atmosphere and, as is well known, such vapors become a source of smog, which under certain ambient conditions produce dangerous fog conditions and so pollute the atmosphere that they produce dangerous environmental health hazards for human beings.

Known vapor recovery systems have used closed refrigeration cycles to cool a medium that is then used to condense vapors. Condensate can be drained to a decanter to separate heavy and light constituents, such as gasoline and water. The condensing coils for such units are periodically warmed or defrosted to prevent a build up of ice and frost that may block the passage of vapors through the condensing unit. See for example, U.S. Pat. Nos. 4,027,495; 4,068,710; and 4,077,789.

Such recovery units are typically designed to handle the peak flow of vapors that may be experienced during a course of a work day. To accommodate the peak load, the recovery units must be engineered with a relatively high capacity, which is underutilized most of the time.

Furthermore, these recovery units do not easily produce temperatures low enough to condense highly volatile vapors. Certain highly volatile pollutants cannot be recovered at all unless extremely low or cryogenic temperatures are reached. Even if extremely low temperatures are not physically necessary, keeping the concentration of exhausted pollutants below a mandated maximum may dictate using extremely low temperatures to reach a high recovery rates. As an example, many states and local jurisdictions have lowered the permissible concentration of gasoline vapors in stacks from 35 mg/L to 10 mg/L.

Known vapor recovery systems have employed a condenser into which liquid nitrogen is sprayed. In this system, the liquid nitrogen is mixed with the vapors, which condense because of the low temperatures of the evaporating liquid nitrogen. The gases treated in the condenser including the gaseous nitrogen are then routed through a recuperator to be warmed by the gases flowing to the inlet line to the condenser. A disadvantage with this system is the fact that the liquid nitrogen is contaminated with the target vapors and cannot be used in subsequent chemical processes that may require pure nitrogen gas.

U.S. Pat. No. 4,982,512 shows a system for recovering solvent vapors in a multiple stage recovery system. One of the stages evaporates liquid nitrogen in a heat exchanger. The nitrogen vaporized in the heat exchanger is used as an inert atmosphere in an oven. The treated gas flow that has been cleaned of vapors is relatively cold but that temperature extreme is not recovered to enhance system efficiency.

U.S. Pat. 4,551,981 shows a three stage vapor condensing system with a final stage using a condensation column in which liquid nitrogen is evaporated. The evaporated nitrogen is then forwarded to an upstream stage for precooling. A disadvantage with this system is that the nitrogen is mixed with the solvent vapors and are therefore so contaminated as to be unusable in other processes that may require pure nitrogen.

U S. Pat. Nos: 3,857,251; 4,320,627; and 4,604,115 show systems employing liquid nitrogen to condense vapors. U.S. Pat. No. 3,802,212 shows the metering of nitrogen gas through cooling coils to refrigerate a truck.

U.S. Pat. No. 4,017,283 shows the use of nitrogen in a closed cycle for condensing vapors. In U.S. Pat. No. 3,347,055 hydrogen is liquified by including a nitrogen refrigeration cycle. In U.S. Pat. No. 3,874,185 natural gas is liquified by a system including a closed nitrogen refrige cycle. See also U.S. Pat. Nos. 4,380,907; 4,575,386; 4,620,962.

In U.S. Pat. No. 3,807,396 the inlet and outlet of a cryogenic reservoir is passed through opposite sides of a heat exchanger to effectively precool the incoming flow and moderate the temperature of the outgoing flow. This reference however is unrelated to vapor condensation and recovery.

In all these systems, the liquified gas and the cleaned gas flow is not is not handled in a way that optimizes efficiency and economizes consumption of liquified gas.

SUMMARY OF THE INVENTION

In accordance with the illustrative embodiments demonstrating features and advantages of the present invention, there is provided a vapor recovery apparatus. The apparatus consumes a source of liquified gas to condense vapors in a source of vapors. The apparatus includes an economizing heat exchanger and a finishing heat exchanger. The economizing heat exchanger has a vapor path adapted to be connected to the source of vapors, and a recovery path for exchanging heat with, and cooling vapors in, the vapor path. The finishing heat exchanger has a finishing path connected downstream of the vapor path of the economizing heat exchanger, and a coolant path adapted to be connected to the source of liquified gas for cooling and condensing vapors in the finishing path. The coolant path is isolated from the finishing path to avoid interpath mixing. The finishing path is connected to feed the recovery path of the economizing heat exchanger.

In accordance with a related method of the same invention, vapor can be condensed and recovered from a source of vapor with a source of liquified gas. The method employs an economizing heat exchanger having a vapor and recovery path, and a finishing heat exchanger having a finishing and coolant path. The method includes the step of directing the source of vapor through the vapor path of the economizing heat exchanger, and through the finishing path of the finishing heat exchanger. Another step is supplying the liquified gas to the coolant path of the finishing heat exchanger to cause vapor in the finishing path to condense without mixing with the liquified gas in its liquid or gaseous form. The method also includes the step of feeding gas from the finishing path of the finishing heat exchanger to the recovery path of the economizing heat exchanger to cool vapor in the vapor path.

By employing such apparatus and methods, an improved vapor recovery apparatus is achieved. In a preferred system, a vapor flow is passed through an economizing heat exchanger and then a finishing heat exchanger. The finishing heat exchanger is supplied with liquid nitrogen which evaporates to cool and condense vapors flowing therein. Preferably, consumption of the liquid nitrogen is regulated by a thermostatically controlled valve that responds to the outlet temperature of the treated gases exiting the finishing heat exchanger. This chilled, treated gas is then routed to the economizing heat exchanger to precool the vapors that flow therethrough.

The economizing heat exchanger offers the advantage of utilizing the cooling potential remaining in the treated gas exiting the finishing heat exchanger. Thus rather than simply exhausting these cold gases to atmosphere after removing the vapors, the chilled gases are used to drive the upstream economizing heat exchanger.

Also in a preferred embodiment, the economizing heat exchanger can have two stages. The vapor stream about to be treated passes successively through the first and second stage. The stream about to be treated is chilled by the gases that have already been treated in the finishing heat exchanger. These treated gases pass through the first stage before reaching the second stage. (Although in other embodiments the flow can be reversed or passed through the two stages in parallel).

In one preferred embodiment, the foregoing apparatus is used as an accessory in the output of a conventional vapor recovery unit, employing a closed refrigeration cycle to condense vapors. When the capacity of this conventional recovery unit is exceeded, vapor laden gases can be treated by the two heat exchangers described herein.

Preferably, a defrosting system removes frozen vapors in the exchangers by feeding back the clean gases exiting the economizer to the vapor inlet of the economizing heat exchanger. Thus the vapor path through both heat exchangers forms a closed loop that raises the temperature in the path. Also, the temperature can be actively raised by employing a blower that works against an orifice plate to provide heat or by using an additional heat source consisting of an indirectly heated coil installed in the blower path, or by using the heat source from an existing vapor recovery unit (VRU).

BRIEF DESCRIPTION OF THE DRAWINGS

The above brief description, as well as other objects, features and advantages of the present invention will be more fully appreciated by reference to the following detailed description of presently preferred, but nonetheless illustrative embodiments, in accordance with the present invention, when taken in conjunction with the accompanying drawings, wherein.

DESCRIPTION OF THE PREFERRED EMBODIMENTS

Figure 1:
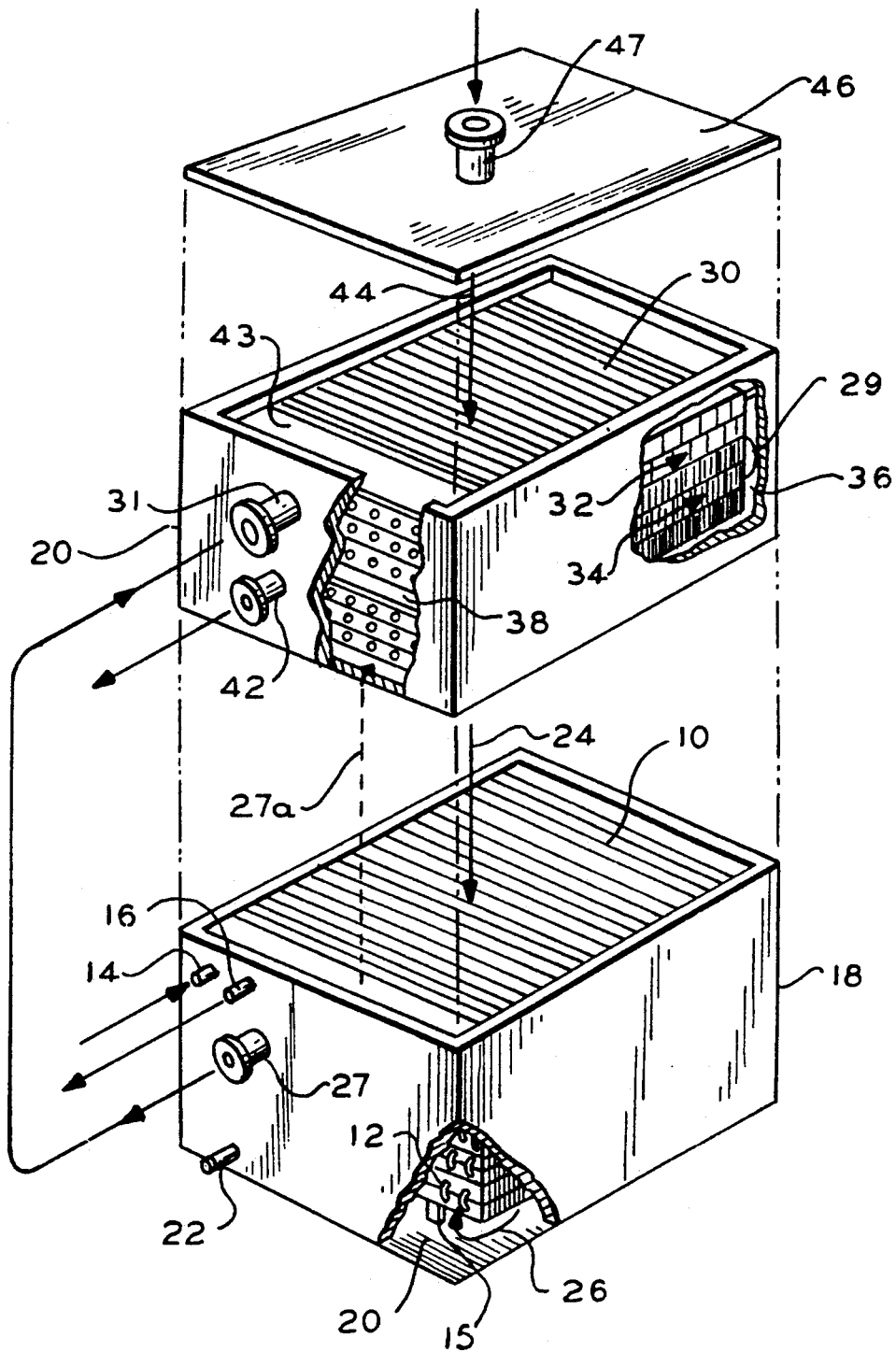
FIG. 1 is an axonometric view of a vapor recovery apparatus in accordance with the principles of the present invention.

Referring to FIG. 1, a vapor recovery apparatus is shown having a finishing heat exchanger 10. Exchanger 10 has a plurality of finned pipes 12 running horizontally, except for U-shaped reversal joints at the ends of each horizontal course. The horizontal pipes are serially connected to form a serpentine path, so that each horizontal excursions of the pipe is succeeded vertically, in a zig zag fashion. Pipes 12 provide a coolant path that begins at inlet pipe 14 and ends at outlet pipe 16.

Finned pipes 12 may have the conventional structure normally employed by a heat exchanger. The fins are mounted in a vertical plane perpendicular to the length of pipes 12. The fin to fin spacing may be $\frac{1}{4}$ inch, although in other embodiments the spacing will be varied depending upon the desired heat transfer rate, capacity, pressure drop, flow volume, and need to accumulate frozen hydrocarbons, etc. Pipes 12 are made of materials suitable for handling a cryogenic fluid such as liquid nitrogen or such other medium as may be flowing through pipes 12.

Finishing heat exchanger 10 is mounted inside case 18 which has dual walls separated by an insulator such as a urethane foam. The thickness and substance of the insulator can be selected according to the desired degree of insulation and efficiency.

Heat exchanger 10 is raised above the floor of case 18 to form underneath exchanger 10 a space or lower catch 20. Catch 20 can be graded to divert condensate to drain 22. Catch 20 is part of an internal gas passage. A finishing path past the fins of pipes 12 proceeds along path 24 to path 26. A temperature sensing element 15 is shown mounted along path 26 adjacent to the lower most fins of heat exchanger 10 for a purpose to be described presently.

Path 26 proceeds through catch 22 and makes an upward turn into the internal passage existing between the internal wall of case 18 and an end of finishing heat exchanger 10. In this embodiment path 26 communicates with flanged duct 27 for delivery to a location to be described presently. In other embodiments the flow from path 26 can continue through the internal passage to emerge along path 27A (a path blocked in the illustrated embodiment) for a purpose also to be described presently.

Case 18 is shown mating with an upper case 20. While cases 18 and 20 are shown as separate units, in most embodiments they will be formed of one continuous case. In either event case 20 will have a double walled construction containing an insulator similar to case 18. Mounted within upper case 20 is an economizing heat exchanger 30. Exchanger 30 includes an upper, primary stage exchanger 32 and a secondary stage exchanger 34. Each of the exchanger stages 32 and 34 have a plurality of finned tubes that are open at each end so that the tubes in each stage are effectively connected in parallel. The far ends of the tubes of exchanger stages 32 and 34 communicate through an internal passage 36 along path 29. The near ends of the tubes of exchanger stage 32 are separated from those of exchanger stage 32 by barrier 38. The near ends of the tubes of exchangers 32 and 34 communicate with flanged ducts 31 and 42, respectively. In the preferred embodiment, ducts 27 and 31 are connected together.

With case 18 and 20 attached together, cover 46 can be mounted atop case 20 to permit a flow through flanged duct 47 to vapor path 44–24 through exchanger 30. Accordingly, with case 20 mounted atop case 18, and ducts 27 and 31 interconnected, paths 44, 24 and 26 communicate through catch 20 and through the illustrated ducts into the tubes of exchanger stage 32, returning along path 29 and through the tubes of exchanger stage 34 to duct 42. In an alternative embodiment, path 26 is not blocked above, so that gas flows along path 27A directly into the tubes of exchanger stage 34, returning through the tubes of exchanger stage 32 to duct 42.

The flow path 44 around the tubes and parallel to the fins of the exchanger 32 and 34 is herein referred to as a vapor path. The interconnected flow path through the finned tubes of exchangers 32 and 34, including path 29, is herein referred to as a recovery path.

The fin to fin spacing in secondary stage exchanger 34 may be $\frac{1}{4}$ inch, although this spacing can vary depending upon the desired efficiency, capacity, heat transfer rate, etc. The primary stage exchanger 32 is shown having a fin to fin spacing that decreases in a downstream direction. The wider fin to fin spacing in the upstream positions is designed to tolerate some build-up of frozen vapor on the fins. Since the fin to fin spacing is fairly large at the upstream positions, there is less of a tendency for clogging caused by frozen vapors completely filling or blocking the space between fins. Since most of the frozen vapor is deposited in the earlier stages, the fin to fin spacing can be less in downstream positions. For example, the fin to fin spacing may decrease from $1\frac{1}{2}$ inches to $\frac{1}{2}$ inch from the first layer of tubes to the last layer, in the primary stage exchanger 32. The fins will be designed with the surface area needed to produce the desired heat transfer as well as with clearance sufficient to account for accumulation of frozen vapors. Furthermore, the velocity of gas flow through the fins will be kept below a velocity that might tend to dislodge and entrain droplets that should ordinarily collect at drain 22. It will appreciated however, that these design parameters spacing can be varied depending upon the desired capacity, efficiency, heat transfer, volume of vapor, etc.

Figures 2, 3A, 3B, 3C:
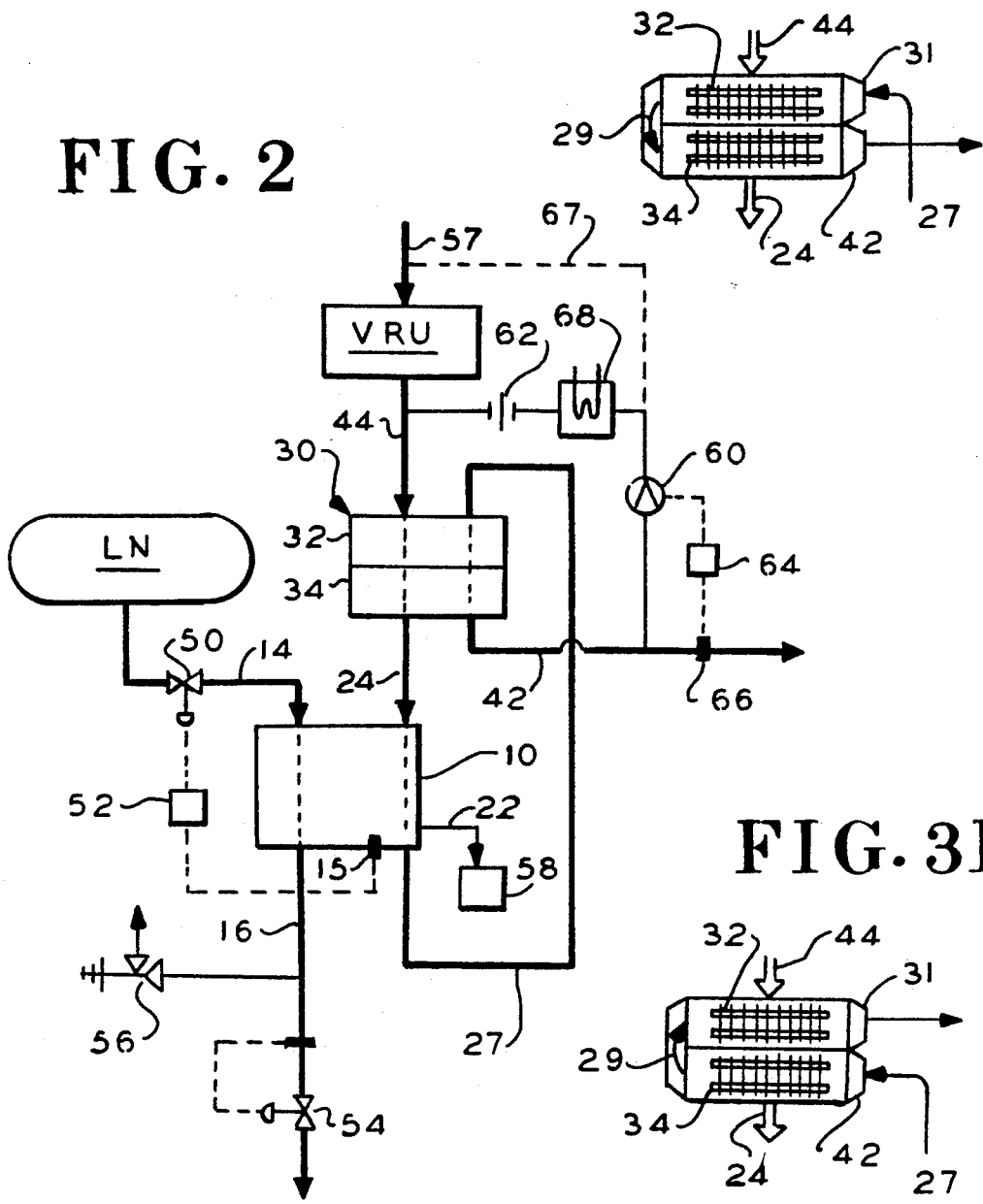
FIG. 2 is a schematic flow diagram illustrating the operating environment of the vapor recovery apparatus of FIG. 1.
FIGS. 3A–3C are schematic diagrams showing three alternate connection schemes for the economizing heat exchanger of FIGS. 1 and 2.

Referring to FIG. 2, previously illustrated economizing heat exchanger 30 and finishing heat exchanger 10 are shown schematically connected together with the passages and lines previously identified in FIG. 1 bearing the same reference numerals herein.

A source of vapor is shown derived from active unit VRU. Unit VRU may be a vapor recovery system such as that shown in the patents mentioned in the paragraph above. Without describing the technology of those patents in detail, unit VRU contains a refrigeration unit operating in a closed cycle to chill a medium that flows through a condenser to condense some of the vapors flowing from path 57 to path 44.

A source of liquified gas, shown herein as storage tank LN, contains liquid nitrogen, although other liquified gases such as carbon dioxide can be used instead. Nitrogen is preferred for its relatively cold temperatures and its ease of use. Tank LN feeds through regulating valve 50 to previously illustrated coolant path 14–16 in finishing exchanger 10.

The previously mentioned temperature sensor 15 is shown connected to a temperature sensing means 52. Means 52 is a controller designed to increase the flow rate through regulating valve 50 if the temperature at sensor 15 exceeds a desired target temperature. The target temperature is preferably $-250°$ F., but may be varied in other designs, depending upon the desired efficiency, capacity or if a different coolant is used other than liquid nitrogen. The temperature should also be regulated to avoid condensing atmospheric gases, specifically oxygen.

The outlet 16 of the coolant path is connected to a back pressure valve 54, which acts to maintain a certain minimum pressure inside coolant path 14–16. A pressure relief valve 56 is shown connected to outlet 16 of the coolant path to relieve excessive pressure that may occur should the liquid nitrogen boil in an unexpectedly violent manner.

Previously illustrated drain 22 of finishing heat exchanger 10 feeds a separating means 58. Means 58 may be a decanter as illustrated in U.S. Pat. Nos. 4,027,495; 4,068,710; or 4,077,789, which are incorporated herein by reference. Means 58 may be a chamber with a weir that allows lighter constituent to overflow the weir, thereby separating heavy and light constituents in the condensate flowing through drain 22. Alternatively, condensate can simply be collected in means 58 for later removal and processing at a different location.

A defrosting means is shown herein as blower 60, acting as a feedback means for returning cleaned gas in path 42 to vapor path 44. Blower 60 performs work on the gas bearing against restriction device 62, shown herein as an orifice plate. Because blower 62 works through orifice plate 62 the temperature of the flow is increased. In the event an auxiliary heat source is required, an auxiliary heating coil 68 may be employed within this flow path in series with (or instead of) plate 62. Coil 68 may be part of a heat exchanger and may be heated by a fluid available at the site. In some cases the fluid may be heated by a source such as an electric heater (not shown). As an alternative, the flow path may be established to divert gas through the previously described unit VRU when it is in a defrost mode. The diverted gas will thereby utilize the heat source from the existing defrost system of unit VRU. A timer means 64 is connected to blower 60 to energize it periodically. A thermostatic control 66 senses the temperature in recovery path 42 to disable through timer means 64, blower 60 when the temperature in path 42 is excessive. This safety feature prevents high temperatures, which may raise the associated vapors to their flashpoint.

A blower is preferred rather than a separate warming coil. Given the relatively low temperatures involved, a separate defrosting coil would need to tolerate extreme temperatures and would, without careful design, tend to freeze and burst. Furthermore, a direct electric heater would have the difficulty of presenting a relatively warm surface with a sharp temperature gradient. The consequently high spot temperatures may chemically alter the vapors or bring volatile vapors to a flashpoint.

Referring to FIG. 3A, the previously illustrated heat economizing heat exchanger 32, 34 is shown with the previously mentioned flow paths labeled in the same fashion. The primary stage exchanger 32 is fed first from outlet 27 of the finishing heat exchanger.

The arrangement of FIG. 3A is preferred because the greatest temperature difference will then exist between the relatively warm, incoming vapor in path 44 and the relatively cold gas in path 27 from the finishing heat exchanger. This great temperature difference ensures a high rate of heat transfer in the primary stage exchanger 32.

In comparison, in the alternate embodiment of FIG. 3B the outlet 27 of the finishing heat exchanger is fed to the secondary stage exchanger 34 so that a reverse flow is established. Referring to FIG. 3C, primary and secondary stage exchangers 32 and 34 are connected in parallel. Thus, outlet 27 of the finishing heat exchanger is connected to both of the exchangers 32 and 34 in parallel.

To facilitate an understanding of the principles associated with the foregoing apparatus, its operation will now be briefly described. A source of vapor to be treated flows in path 57 to vapor path 44. The vapors in path 57 and 44 can include gasoline vapors, methylene chloride or other volatile hydrocarbons, as well as water vapors. In one embodiment the flow rate of gas through lines 44–27 was about 250 CFM, although other rates can be employed depending upon the application. While vapor recovery unit VRU is shown in series between paths 57 and 44, in some embodiments no such unit will be employed. With unit VRU present, the temperature in path 44 will be about $-100°$ F.

At this time, liquid nitrogen from tank LN is flowing through coolant path 14–16 through finishing heat exchanger 10. Back pressure valve 54 maintains a pressure in paths 14 and 16 of about one atmosphere, although other pressure may be established instead. The temperature sensed by sensor 15 regulates, through temperature sensing means 52, the setting of valve 50 so that the liquid nitrogen flows at a rate adequate to keep the temperature at sensor 15 within a desired range, suitably a nominal temperature of 250° F. With the temperature at sensor 15 so regulated, the outlet temperature of nitrogen gas in path 16 will be about $-210°$ F., having risen from a temperature of about $-300°$ F. at inlet path 14.

The vapors in path 44 flow through the vapor path in exchanger 30 and the finishing path in finishing heat exchanger 10. The vapors passing through the finishing heat exchanger 10 through finishing path 24–27 are cooled by losing heat to the relatively cold flow of liquid nitrogen, which evaporates within heat exchanger 10. The relatively cold, clean gas output on path 27 is fed back to the recovery path 27–42 in economizing heat exchanger 30. This feedback allows chilling of vapors passing through economizing exchanger 30 along path 44–24. Vapors cooled in economizing heat exchanger 30 have a temperature of about $-200°$ F. in path 24. The output temperature in line 42 is normally 150° F.

The nitrogen exhausted through valve 54 16 can be diverted to another process within an associated plant. The nitrogen is pure since it did not mix with any hydrocarbon vapors. Therefore this pure nitrogen may be useful for various manufacturing processes that consume nitrogen.

Because cooling is achieved by relatively cold liquid nitrogen, a higher recovery rate is obtained. With these relatively cold temperatures, the gas is treated more efficiently. In addition, there are certain volatile pollutants that would not be condensed unless temperatures were brought to the relatively low temperatures of liquid nitrogen or other coolants (for example liquid carbon dioxide). Liquid nitrogen however, is preferred since it is environmentally safe, plentiful and relatively effective.

Because of the cooling in exchangers 30 and 10 vapors may condense in either of these exchangers. As a result, condensate falls to the bottom of exchanger 10 to flow out drain 22 into separator 58. Separator 58 may separate light and heavy constituents in the condensate.

A relatively heavy volume of vapor through primary stage exchanger 32 can cause a build-up of frozen vapors on the fins inside exchanger 32, or the other exchangers. Consequently, exchangers 30 and 10 are periodically subjected to a defrosting cycle. A timer in means 64 periodically energizes blower 60 to pressurize gas from path 42 by working through orifice plate 62 and utilizing additional heat sources, if required, as previously described. As an example, defrosting may occur for one hour once every eight hours. The consequently warmed gases then flow through paths 44, 24, and 27, through exchangers 30 and 10. This warmed flow will melt the frozen vapors, which then flow through drain 22. The melted condensate can then be separated in means 58, or means 58 may simply be a tank that is drained for further processing, at the end of the defrost cycle.

Should the temperature of gas leaving path 42 become excessive, temperature sensor 66 will thermostatically control blower 60 and, preferably, shut it off. This prevents an excessive temperature rise that may bring some of the volatile hydrocarbons to a flashpoint.

It is to be appreciated that various modifications may be implemented with respect to the above described preferred embodiments. For example, the finishing and economizing heat exchangers can be arranged otherwise than in a vertical stack. In some instances, the two heat exchangers may lie side by side or may be stacked in the reverse order. Similarly, the primary and secondary stage exchangers of the economizing heat exchanger can be separate units or can be stacked in a different manner. In addition, the finishing heat exchanger can be a single unitary stage or several stages, depending upon the application. Also, while various flanged ducts are shown projecting from the side or top of the unit, in other embodiments the positions of these ducts can be altered and in some embodiments all ducts may extend from the top (or from one of the sides). Furthermore, the temperature sensors can be thermocouples, bimetallic elements, thermistors or other temperature sensitive devices that can operate an electrical or mechanical accessory. Also, while finned tubes are shown for the heat exchangers, in some embodiments coaxial pipes nested coaxially in a cylindrical shell may be employed instead. Moreover, the materials used to fabricate the finned pipes can be altered depending upon the desired strength, rigidity, temperature, heat transfer rate, temperature sensitivity, etc. Additionally, pressure relief valves may be used at various points depending upon the likelihood of a high pressure build up. Also, the temperature sensor that regulates the flow of liquid nitrogen can be placed at various locations depending on the nature of the process being controlled. In addition, the various flow rates, temperatures, and temperature drops can be designed to accommodate the specific vapor flow being treated.

Obviously, many modifications and variations of the present invention are possible in light of the above teachings. It is therefore to be understood that within the scope of the appended claims, the invention may be practiced otherwise than as specifically described.

I claim:

1. A vapor recovery apparatus consuming a source of liquified gas to condense vapors in a source of vapors, comprising:
   an economizing heat exchanger having a vapor path adapted to be connected to said source of vapors, and a recovery path for exchanging heat with and cooling vapors in said vapor path; and
   a finishing heat exchanger having a finishing path connected downstream of said vapor path of said economizing heat exchanger, and a coolant path adapted to be connected to said source of liquified gas for cooling and condensing vapors in said finishing path, said coolant path being isolated from said finishing path to avoid interpath mixing, said finishing path being connected to feed said recovery path of said economizing heat exchanger.

2. A vapor recovery apparatus according to claim 1 wherein said recovery path is isolated from said vapor path to avoid interpath mixing.

3. A vapor recovery apparatus according to claim 2 further comprising:
   a regulating valve coupled between said source of liquified gas and said finishing heat exchanger for regulating the flow of the liquified gas into said coolant path; and
   temperature sensing means coupled to said regulating valve and said finishing heat exchanger for adjusting said regulating valve to keep temperature of gas leaving said finishing path near a predetermined finishing temperature.

4. A vapor recovery apparatus according to claim 3 further comprising:
   a backpressure valve coupled downstream of said coolant path for regulating the pressure within said coolant path.

5. A vapor recovery apparatus according to claim 3 wherein said economizing heat exchanger comprises:
   a primary stage exchanger having a primary vapor course adapted to be connected to said source of vapors; and
   a secondary stage exchanger having a secondary vapor course connected downstream from said primary vapor course.

6. A vapor recovery apparatus according to claim 5 wherein said primary stage exchanger has a primary recovery course coupled downstream from said finishing path of said finishing heat exchanger, said secondary stage exchanger having a secondary recovery course coupled downstream from said primary recovery course.

7. A vapor recovery apparatus according to claim 5 wherein said secondary stage exchanger has a secondary recovery course coupled downstream from said finishing path of said finishing heat exchanger, said primary stage exchanger having a primary recovery course coupled downstream from said secondary recovery course.

8. A vapor recovery apparatus according to claim 5 wherein said primary and secondary stage exchangers have a primary and secondary recovery course, respectively, coupled in parallel downstream from said finishing path of said finishing heat exchanger.

9. A vapor recovery apparatus according to claim 5 wherein said primary and secondary stage exchangers each comprise a plurality of finned tubes.

10. A vapor recovery apparatus according to claim 9 wherein said finned tubes of said primary stage exchanger are connected in parallel, and wherein said finned tubes of said secondary stage exchangers are connected in parallel.

11. A vapor recovery apparatus according to claim 9 wherein given ones of said finned tubes of said primary stage exchanger have a fin to fin spacing exceeding that of given ones of said finned tubes of said secondary stage exchanger.

12. A vapor recovery apparatus according to claim 11 wherein upstream ones of said finned tubes of said primary stage exchanger have a fin to fin spacing exceeding that of downstream ones of said finned tubes of said primary stage exchanger.

13. A vapor recovery apparatus according to claim 12 wherein upstream ones of said finned tubes of said secondary stage exchanger have a fin to fin spacing exceeding that of downstream ones of said finned tubes of said secondary stage exchanger.

14. A vapor recovery apparatus according to claim 13 wherein said primary stage exchanger has a primary recovery course coupled downstream from said finishing path of said finishing heat exchanger, said secondary stage exchanger having a secondary recovery course coupled downstream from said primary recovery course, said primary and secondary recovery course extending through the interior of said finned tubes.

15. A vapor recovery apparatus according to claim 5 wherein said finishing heat exchanger has a plurality of finned pipes, said coolant path extending through the interior of said finned pipes.

16. A vapor recovery apparatus according to claim 15 wherein said coolant path includes a serpentine course having successive excursions that 4 recur in the same direction as said finishing path.

17. A vapor recovery apparatus according to claim 5 comprising:
   defrosting means for recurrently eliminating frozen vapors from said economizing heat exchanger.

18. A vapor recovery apparatus according to claim 17 wherein said defrosting means comprises:
   timer means for periodically operating said defrosting means.

19. A vapor recovery apparatus according to claim 18 wherein said defrosting means comprises:
   a feedback means coupled downstream of said recovery path of said economizing exchanger to forward gas therefrom to upstream of said vapor path 6 of said economizing exchanger.

20. A vapor recovery apparatus according to claim 19 wherein said defrosting means comprises:
   a thermostatic control for disabling said feedback means in response to temperature of gas from said recovery path exceeding a predetermined limit.

21. A vapor recovery apparatus according to claim 20 wherein said feedback means comprises:
   a blower coupled downstream of said recovery path of said economizing exchanger to forward gas therefrom to upstream of said vapor path of said economizing exchanger.

22. A vapor recovery apparatus according to claim 21 wherein said feedback means comprises:
   either one of a restriction device or an auxiliary heat source serially connected downstream of said blower to elevate the temperature of gas from said feedback means.

23. A vapor recovery apparatus according to claim 5 comprising:

a storage tank containing said liquified gas and communicating with said coolant path of said finishing heat exchanger.

24. A vapor recovery apparatus according to claim 23 wherein said storage tank contains liquified nitrogen gas.

25. A vapor recovery apparatus according to claim 5 comprising:
a case containing said finishing heat exchanger, said case having a lower catch for holding condensate from said finishing heat exchanger, and a drain for removing said condensate.

26. A vapor recovery apparatus according to claim 25 comprising:
a separating means coupled to said drain of said case for separating heavy and light constituents in said condensate.

27. A vapor recovery apparatus according to claim 25 wherein said economizing heat exchanger is mounted in said case over said finishing heat exchanger to allow condensate from said economizing heat exchanger to drip into said lower catch.

28. A vapor recovery apparatus according to claim 27 wherein said case has a plurality of internal passages to interconnect said economizing heat exchanger and said finishing heat exchanger.

29. A vapor recovery apparatus according to claim 1 wherein said finishing heat exchanger is arranged to consume said liquified gas at a rate to produce a temperature immediately downstream of said finishing path of less than −200° F.

30. A vapor recovery apparatus according to claim 29 wherein said finishing heat exchanger is arranged to consume said liquified gas at a rate to produce a temperature immediately downstream of said finishing path of about −250° F.

31. A vapor recovery apparatus according to claim 1 further comprising:
a refrigeration unit for circulating a cooling medium in a closed cycle; and
a condensing means connected upstream of said vapor path of said economizing heat exchanger for condensing vapors, said condensing means being connected to said refrigeration unit to withdraw heat through said cooling medium.

32. A vapor recovery apparatus according to claim 31 further comprising:
a separator coupled to said condensing means for separating heavy and light constituents in condensate from said condensing means.

33. A vapor recovery apparatus according to claim 5 further comprising:
a refrigeration unit for circulating a cooling medium in a closed cycle; and
a condensing means connected upstream of said vapor path of said economizing heat exchanger for condensing vapors, said condensing means being connected to said refrigeration unit to withdraw heat through said cooling medium.

34. A vapor recovery apparatus consuming a source of liquified gas to condense vapors from an active unit employing a refrigeration unit circulating a cooling medium in a closed cycle through a condensing apparatus, comprising:
an economizing heat exchanger having a vapor path adapted to be connected to said active unit, and a recovery path for exchanging heat with and cooling vapors in said vapor path; and
a finishing heat exchanger having a finishing path connected downstream of said vapor path of said economizing heat exchanger, and a coolant path adapted to be connected to said source of liquified gas for cooling and condensing vapors in said finishing path, said coolant path being isolated from said finishing path to avoid interpath mixing, said finishing path being connected to feed said recovery path of said economizing heat exchanger.

35. A vapor recovery apparatus according to claim 34 wherein said recovery path is isolated from said vapor path to avoid interpath mixing.

36. A vapor recovery apparatus according to claim 35 further comprising:
a regulating valve coupled between said source of liquified gas and said finishing heat exchanger for regulating the flow of the liquified gas into said coolant path; and
temperature sensing means coupled to said regulating valve and said finishing heat exchanger for adjusting said regulating valve to keep temperature of gas leaving said finishing path near a predetermined finishing temperature.

37. A vapor recovery apparatus according to claim 36 further comprising:
a backpressure valve coupled downstream of said coolant path for regulating the pressure within said coolant path.

38. A vapor recovery apparatus according to claim 36 wherein said economizing heat exchanger comprises:
a primary stage exchanger having a primary vapor course adapted to be connected to said source of vapors; and
a secondary stage exchanger having a secondary vapor course connected downstream from said primary vapor course.

39. A vapor recovery apparatus according to claim 38 comprising:
defrosting means for recurrently eliminating frozen vapors from said economizing heat exchanger.

40. A vapor recovery apparatus according to claim 39 further comprising:
timer means for periodically operating said defrosting means.

41. A vapor recovery apparatus according to claim 40 comprising:
a feedback means coupled downstream of said recovery path of said economizing exchanger to forward gas therefrom to upstream of said vapor path 6 of said economizing exchanger.

42. A vapor recovery apparatus according to claim 38 comprising:
a storage tank containing said liquified gas and communicating with said coolant path of said finishing heat exchanger.

43. A vapor recovery apparatus according to claim 42 wherein said storage tank contains liquified nitrogen gas.

44. A vapor recovery apparatus according to claim 34 wherein said finishing heat exchanger is arranged to consume said liquified gas at a rate to produce a temperature immediately downstream of said finishing path of less than −200° F.

45. A vapor recovery apparatus according to claim 44 wherein said finishing heat exchanger is arranged to consume said liquified gas at a rate to produce a temperature immediately downstream of said finishing path of about −250° F.

46. A method for condensing and recovering vapor from a source of vapor with a source of liquified gas, an economizing heat exchanger having a vapor and recovery path, and a finishing heat exchanger having a finishing and coolant path, comprising the steps of:
   directing said source of vapor through the vapor path of said economizing heat exchanger, and through the finishing path of said finishing heat exchanger;
   supplying said liquified gas to the coolant path of said finishing heat exchanger to cause vapor in said finishing path to condense without mixing with said liquified gas in its liquid or gaseous form;
   feeding gas from the finishing path of said finishing heat exchanger to the recovery path of said economizing heat exchanger to cool vapor in the vapor path.

47. A method according to claim 46 wherein said step of feeding gas to the recovery path is performed without mixing with vapor in said vapor path of said economizing heat exchanger.

48. A method to claim 47 further comprising the steps of:
   regulating the flow of the liquified gas into said coolant path; and
   adjusting the flow of the liquified gas to keep temperature of gas leaving said finishing path near a predetermined finishing temperature.

49. A method according to claim 48 further comprising the steps of:
   regulating pressure within said coolant path to stay above a predetermined minimum.

50. A method according to claim 48 wherein the step of feeding gas to the recovery path of said economizing heat exchanger is performed by:
   injecting gas from the finishing path into said economizing heat exchanger in a location in the recovery path proximal to an upstream position in the vapor path, to flow to a location in the recovery path proximal to a downstream position in the vapor path recovery course.

51. A method according to claim 48 wherein the step of feeding gas to the recovery path of said economizing heat exchanger is performed by:
   injecting gas from the finishing path into said economizing heat exchanger in a location in the recovery path proximal to a downstream position in the vapor path, to flow to a location in the recovery path proximal to an upstream position in the vapor path recovery course.

52. A method according to claim 49 further comprising the step of:
   recurrently defrosting frozen vapors from said economizing heat exchanger.

53. A method according to claim 52 wherein the step of defrosting frozen vapors comprises the step of:
   feeding back gas from said recovery path of said economizing exchanger into said vapor path of said economizing exchanger.

54. A method according to claim 53 wherein the step of defrosting frozen vapors comprises the step of:
   stopping the feeding back of gas from said recovery path in response to temperature of gas from said recovery path exceeding a predetermined limit.

55. A method according to claim 54 wherein the step of defrosting frozen vapors comprises the step of:
   pressurizing gas from said recovery path of said economizing exchanger before being fed to said vapor path of said economizing exchanger.

56. A method according to claim 55 wherein said liquified gas is liquified nitrogen gas.

57. A method according to claim 56 comprising the step of:
   separating heavy and light constituents in condensate produced by said finishing heat exchanger.

58. A method according to claim 46 wherein the step of supplying liquified gas is performed at a rate to produce a temperature immediately downstream of said finishing path of less than $-200°$ F.

59. A method according to claim 58 wherein the step of supplying liquified gas is performed at a rate to produce a temperature immediately downstream of said finishing path of about $-250°$ F.

60. A method according to claim 46 further comprising the steps of:
   circulating a cooling medium in a closed cycle; and
   condensing vapors upstream of said vapor path of said economizing heat exchanger by withdrawing heat through said cooling medium.

61. A method according to claim 60 wherein the step of condensing vapors upstream of said vapor path comprises the step of:
   separating heavy and light condensates.

62. A method according to claim 48 further comprising the steps of:
   circulating a cooling medium in a closed cycle; and
   condensing vapors upstream of said vapor path of said economizing heat exchanger by withdrawing heat through said cooling medium.

* * * * *